(12) United States Patent
Yi et al.

(10) Patent No.: US 8,954,079 B2
(45) Date of Patent: Feb. 10, 2015

(54) MOBILE COMMUNICATION SYSTEM AND BASE STATION IDENTIFIER MANAGEMENT METHOD THEREOF

(71) Applicant: Samsung Electronics Co., Ltd., Gyeonggi-do (KR)

(72) Inventors: Byoungha Yi, Seoul (KR); Kiyoung Han, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 263 days.

(21) Appl. No.: 13/708,311

(22) Filed: Dec. 7, 2012

(65) Prior Publication Data

US 2013/0150056 A1    Jun. 13, 2013

(30) Foreign Application Priority Data

Dec. 12, 2011    (KR) .................. 10-2011-0132502

(51) Int. Cl.
*H04W 36/00* (2009.01)
*H04W 36/04* (2009.01)
(Continued)

(52) U.S. Cl.
CPC .......... *H04W 36/04* (2013.01); *H04W 36/0061* (2013.01); *H04W 24/02* (2013.01); *H04W 36/0083* (2013.01); *H04W 84/045* (2013.01)
USPC ........... 455/444; 455/436; 455/437; 455/439; 455/440; 455/442

(58) Field of Classification Search
CPC ... H04W 84/045; H04W 36/04; H04W 36/30; H04W 36/0061; H04W 36/0083; H04W 48/16; H04W 88/08; H04W 16/26; H04W 48/08; H04W 76/02; H04W 84/047; H04W 88/085; H04W 16/14; H04W 16/16; H04W 16/32
USPC .................................. 436/436–444
See application file for complete search history.

(56) References Cited

U.S. PATENT DOCUMENTS

2010/0311407 A1    12/2010 Yao et al.

FOREIGN PATENT DOCUMENTS

WO    WO 2011/023234    3/2011

OTHER PUBLICATIONS

Amirijoo et al., "Neighbor Cell Relation List and Physical Cell Identity Self-Organization in LTE", IEEE International Conference on Communications Workshop, May 19, 2008.

(Continued)

*Primary Examiner* — Olumide T Ajibade Akonai
*Assistant Examiner* — Edward Zhang
(74) *Attorney, Agent, or Firm* — The Farrell Law Firm, P.C.

(57) ABSTRACT

A mobile communication system and method for managing the base station identifiers is provided. The method includes transmitting macro base station information from a terminal to a first pico base station; transmitting a Neighbor Relation Table (NRT) including the macro base station information from the first pico base station to a Self Organizing Network (SON) server; determining, at the SON server, whether a second pico base station using same Physical Cell Identifier (PCI) as the first pico base station exists by comparing a previously stored NRT with the received NRT; and reallocating, at the SON server, upon determining that the second pico base station uses the same PCI as the first pico base station, new PCIs to the first and second pico base stations.

14 Claims, 5 Drawing Sheets

(51) Int. Cl.
*H04W 24/02* (2009.01)
*H04W 84/04* (2009.01)

(56) References Cited

OTHER PUBLICATIONS

Samsung, "Consideration on having Neighbour Information of HeNB", R3-091678, 3GPP TSG RAN WG3 Meeting #65, Aug. 31, 2009.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10), 3GPP TS 36.300 V10.5.0, Sep. 2011.

3rd Generation Partnership Project; Technical Specification Group Radio Access Network; Evolved Universal Terrestrial Radio Access Network (E-UTRAN); Self-Configuring and Self-Optimizing Network (SON) Use Cases and Solutions (Release 9), 3GPP TR 36.902 V9.3.1, Mar. 2011.

MOBILE COMMUNICATION SYSTEM AND BASE STATION IDENTIFIER MANAGEMENT METHOD THEREOF

PRIORITY

This application claims priority under 35 U.S.C. §119(a) to a Korean patent application filed on Dec. 12, 2011 in the Korean Intellectual Property Office and assigned Serial No. 10-2011-0132502, the entire content of which is incorporated herein by reference.

BACKGROUND OF THE INVENTION

1. Field of the Invention

The present invention relates generally to a mobile communication system and base station identifier management method thereof and, in particular, to a mobile communication system including macro and pico base stations and method for managing the base station identifiers in order to avoid Physical Cell Identifier (PCI) confusion among the pico base stations in the mobile communication system.

2. Description of the Related Art

Mobile communication systems are evolving to provide users with various services utilizing a high data rate. In order to provide these services, the sizes of cells in mobile communication systems tend to increase for system capacity maximization, while the use of the pico base station increases in office/home environments. With the widespread use of the pico base stations, it has become necessary to continue network optimization for frequent installation and uninstallation. This necessity causes an increase in system maintenance and management costs, and therefore, system auto-installation and self-organization network technologies appear to reduce the system maintenance and management cost. Such system auto-installation and self-organization network technologies are being standardized in the standardization organizations such as the 3$^{rd}$ Generation Partnership Project Long Term Evolution (3GPP LTE) and the Institute of Electrical and Electronics Engineers (IEEE).

In order to discriminate among the cells per base station, a Physical Cell Identifier (PCI) in an LTE system may be used. An operation where a terminal performs handover between base stations using the PCI in an LTE system is described as follows.

A base station receives a PCI of the cell having the best signal strength among the neighbor cells from the terminal that is required to perform handover. The base station searches a Neighbor Relation Table (NRT) for the cell corresponding to the PCI to determine it as the handover target cell. Next, the base station sends the context information of the terminal to the target cells to perform the handover.

However, if a plurality of pico base stations exist within the range of a macro cell managed by the macro base station, there can be multiple cells that have the same PCI. This repeated use of the same PCI by multiple neighbor cells leads to a condition referred to as PCI confusion, in which the normal handover becomes impossible. In this case, the source base station to which the terminal is connected performs requests the terminal to report an Evolved Universal Mobile Telecommunications System Terrestrial Radio Access Network (E-UTRAN) Cell Global Identifier (ECGI) as a global cell IDentifier (ID) of the target cell, in order to perform an alternative handover.

The alternative handover causes extra air signaling overhead and longer handover latency than latency that occurs during normal handover, resulting in degradation of handover performance. In order to avoid the alternative handover causing performance degradation, the LTE system avoids the PCI confusion using a Self Organizing Network (SON) server.

FIG. 1 is a diagram illustrating a conventional PCI management mechanism.

Referring to FIG. 1, a terminal (hereinafter, referred to as a User Equipment (UE)) 103 connected to a serving base station (hereinafter, referred to as an Evolved Node B (eNB)) eNB 1 101a (PCI=1) moves to an area of an eNB 2 101b (PCI=2). The UE 103 reports the PCI (PCI=2) of the eNB 2 101b to the serving base station eNB 1 101a, as denoted by reference number 110. Upon receiving the PCI, the eNB 1 101a searches the NRT for the PCI (PCI=2) received from the UE 103, as denoted by reference number 115. If it is determined that a new eNB is found (i.e. if the PCI does not exist in the NRT), the eNB 1 101a requests the UE 103 for an ECGI corresponding to the PCI 2, as denoted by reference number 120. Upon receiving the request, the UE 103 performs an ECGI acquisition procedure with respect to the eNB corresponding to the PCI (PCI=2) and acquires an Internet Protocol (IP) address based on the acquired ECGI.

The eNB 1 101a sends an X2 SETUP REQUEST message to the eNB 2, as denoted by reference number 125. At this time, the X2 SETUP REQUEST message includes the PCI of the eNB 1 101a. Upon receiving the X2 SETUP REQUEST message, the eNB 2 101b compares the PCI of the eNB 1 101a with PCIs stored in its NRT. At this time, the eNB 2 101b checks whether the PCI of the eNB 1 101a is identical to the PCI of a neighbor eNB 3 101c and reports the PCI confusion to the SON server 107, as denoted by reference number 130.

Next, the eNB 2 101b transmits an X2 SETUP RESPONSE message to the eNB 1 101a, as denoted by reference number 135. At this time, the X2 SETUP RESPONSE message includes the NRT of the eNB 2 101b. Upon receiving the X2 SETUP RESPONSE message, the eNB 1 101a compares its PCI with the PCIs in the NRT transmitted by the eNB 2 101b, as denoted by reference number 140. Upon a determination that the PCI of the eNB 3 101c included in the NRT transmitted by the eNB 2 101b is identical with its PCI, the eNB 1 101a reports the PCI confusion to the SON server 107. As a consequence, the SON server 107 reallocates PCIs, as denoted by reference number 145.

In this PCI confusion detection procedure, the neighbor cell must provide its NRT information. Meanwhile, the LTE standard specifies that the NRT information of the neighbor cell is transmitted through X2 interface. However, most network operators do not want to configure X2 interface among macro and pico base stations in a Heterogeneous Network (HetNet) environment.

Operators do not want configuration to be performed in this manner because, if a macro cell and a plurality of pico cells within the range of the macro cell are connected through X2 interface, an X2 message exchange overload is inevitable. Accordingly, most network operators do not want to configure X2 interface among the macro and pico eNBs.

When no X2 interfaces are configured among the macro and pico eNBs, the PCI confusion may be solved through X2 interfaces among macro eNBs and pico eNBs. However, if there is a plurality of pico eNBs within the range of the macro cell (i.e. if the pico cell PCI confusion occurs within a macro cell), the alternative handover is triggered in the handover attempt between the macro and pico eNBs.

SUMMARY OF THE INVENTION

The present invention has been made to address the above-described problems and provide at least the advantages described below. Accordingly, an aspect of the present invention is to provide a mobile communication system and method for managing the eNB identifiers efficiently in the mobile communication.

In accordance with an aspect of the present invention, a base station identifier management method of a mobile communication system is provided. The method includes transmitting macro base station information from a terminal to a first pico base station; transmitting a Neighbor Relation Table (NRT) including the macro base station information from the first pico base station to a Self Organizing Network (SON) server; determining, at the SON server, whether a second pico base station using same Physical Cell Identifier (PCI) as the first pico base station exists by comparing a previously stored NRT with the received NRT; and reallocating, at the SON server, upon determining that the second pico base station uses the same PCI as the first pico base station, new PCIs to the first and second pico base stations.

According to another aspect of the present invention, a base station identifier management method of a Self Organizing Network (SON) server is provided. The method includes receiving a Neighbor Relation Table (NRT) from a pico base station; comparing the received NRT with a previously stored NRT; determining, based on a result of the comparison, whether at least two pico base stations using same PCI exist; and reallocating, upon determining that at least two pico base stations using same PCI exist, new PCIs to the pico base stations having the same PCI.

According to another aspect of the present invention, a mobile communication system managing base station identifiers is provided. The mobile communication system includes a terminal for transmitting macro base station information; a pico base station for receiving the macro base station information and transmitting a Neighbor Relation Table (NRT) including the macro base station information to a Self Organizing Network (SON) server; and the SON server for comparing the received NRT with a previously stored NRT, determining whether at least two pico base stations using same PCI exist, and, upon determining that at least two pico terminals having the same PCI exist, reallocating new PCIs to the pico base stations having the same PCI.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE PRESENT INVENTION

Embodiments of the present invention are described as follows with reference to the accompanying drawings in detail. Detailed descriptions of well-known functions and structures incorporated herein may be omitted to avoid obscuring the subject matter of the present invention. Furthermore, terms used herein are defined in consideration of functions of the present invention, and can be changed according to the practice or intention of users or operators.

In the following description, a Self Organizing Network (SON) server according to embodiments of the present invention adopts artificial intelligence to a communication facility, in order to complement wave propagation characteristics continuously influenced by environmental changes and an amount of subscriber usage. The SON server can be utilized in various radio communication technologies such as Code Division Multiple Access (CDMA) and Long Term Evolution (LTE), and is a promising technology for competitiveness of the telecommunication carriers with respect to cost effectiveness and management efficiency. The SON technology is capable of reducing base station deployment costs and service coverage holes with the widespread use of femto cells.

The SON server according to embodiments of the present invention is capable of performing self-recovery for automatically detecting and removing a problem, self-optimization for optimizing data output, data transmission range, capacity, and Quality of Experience (QoE), and self-configuration for configuring connection and setting to minimize the operator's intervention. These advantageous features improve network throughput and reduce maintenance costs.

Figure 1:
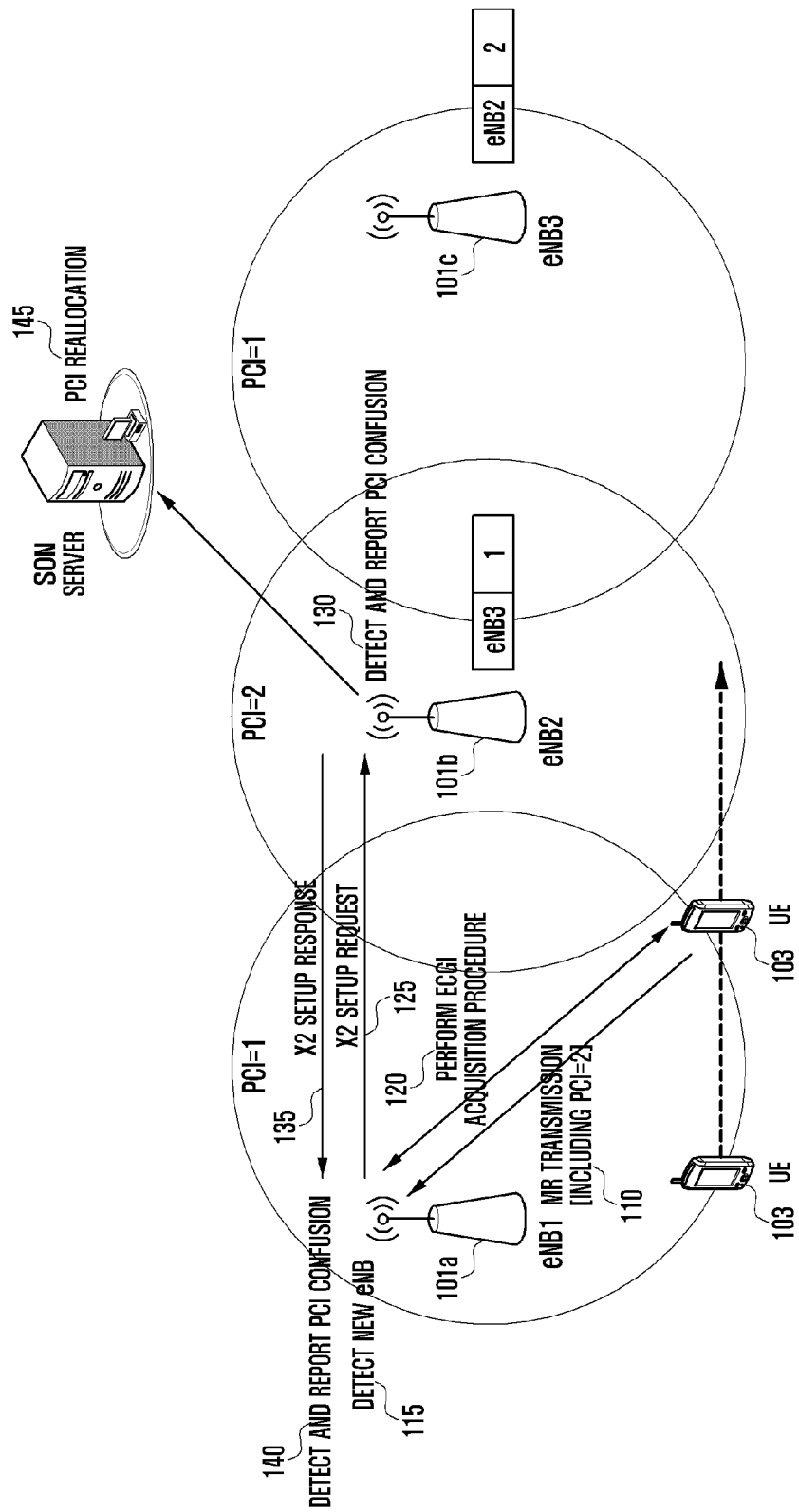
FIG. 1 is a diagram illustrating a conventional PCI management mechanism.
Figure 2:
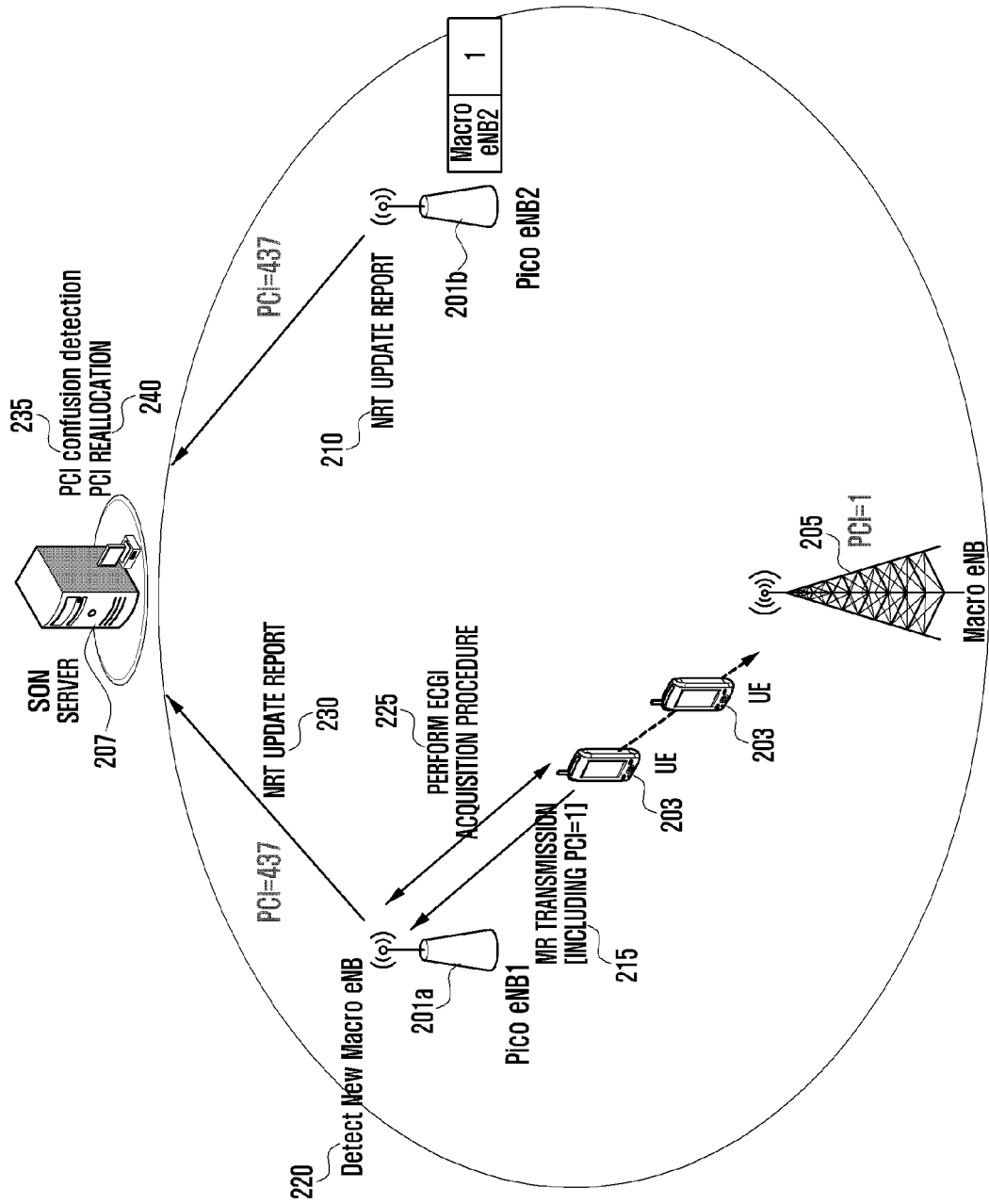
FIG. 2 is a diagram illustrating an architecture of a mobile communication according to an embodiment of the present invention.

FIG. 2 is a diagram illustrating an architecture of a mobile communication according to an embodiment of the present invention.

Referring to FIG. 2, the mobile communication system includes pico eNBs (i.e. pico eNB 1 201a and pico eNB 2 201b), a UE 203, a macro eNB 205, and a SON server 207. The pico eNB 1 201a, pico eNB 2 201b, UE 203, and SON server 207 exchange messages to detect PCI confusion within the macro cell coverage and reallocate PCIs to the pico eNBs. More specifically, a pico eNB is capable of detecting a PCI confusion within the macro cell using only the message transmitted by the SON server without using X2 interface in an LTE heterogeneous network (HetNet) environment.

If neighbor cell information is changed and thus a Neighbor Relation Table (NRT) is updated, the pico eNB 2 201b reports this update to the SON server, as denoted by reference number 210. At this time, the pico eNB 2 201b transmits its PCI (i.e. PCI=437), and the PCI of the macro eNB 205 (i.e. PCI=1).

The UE 203 connected to the pico eNB 1 201a (PCI=437) as its serving eNB moves to the cell area managed by the macro eNB 205 (PCI=1). At this time, the UE 203 detects the PCI of the macro eNB 205 and reports the PCI of the macro cell 205 to the pico eNB 1 201a in the Measurement Report (MR), as denoted by reference number 215.

The pico eNB 1 201a checks whether a new macro eNB has detected as denoted by reference number 220. More specifically, the pico eNB 1 201a checks whether the PCI of the macro eNB 205 which is reported by the UE 203 is included in its NRT, in order to determine the detection of the new macro eNB. Next, the pico eNB 1 201a requests the UE 203 for an ECGI as a Global Cell ID of the macro eNB 205, as denoted by reference number 225. The pico eNB 1 201a updates the NRT with the PCI and ECGI of the macro eNB 205 acquired from the eNB 203.

The pico eNB 1 201a reports the updated NRT to the SON server 207, as denoted by reference number 230. At this time, the eNB 1 201a transmits its PCI (PCI=437) to the SON server 207. The SON server 207 compares the NRT reported by the pico eNB 1 201a with the NRT of the pico eNB 2 201b, as denoted by reference number 235. Since the PCIs of the pico eNB 1 201a and the pico eNB 2 201b match each other as PCI=437, the SON server 207 detects the pico PCI confusion in the macro cell. Once the PCI confusion has been detected, the SON server 207 reallocates PCIs to the pico neb 1 201a and pico eNB 2 201b. Although not depicted in the drawing, the SON server 207 sends the reallocated PCIs to the pico eNB 1 201a and pico eNB 2 201b, respectively.

According to an embodiment of the present invention, the SON server is capable of detecting and processing PCI confusion occurring between two pico cells deployed within the macro cell area. More specifically, the SON server compares the NRTs transmitted by at least two pico eNBs managing their respective pico cells within a macro cell area with each other and, if there is pico eNBs having the same PCI, reallocates PCIs to the pico eNBs.

Figure 3:
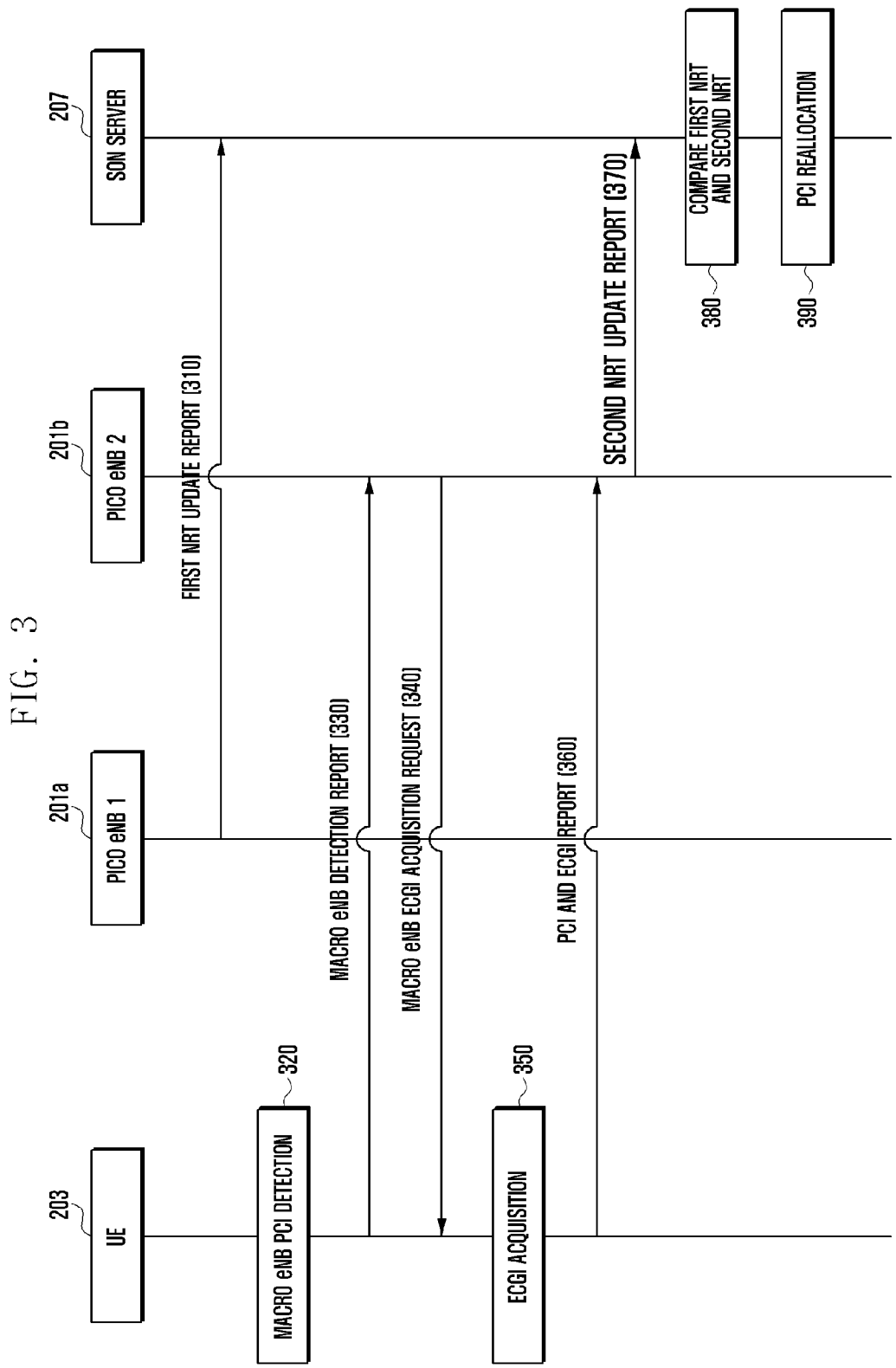
FIG. 3 is a signal flow diagram illustrating a PCI management method in the mobile communication system according to an embodiment of the present invention.

FIG. 3 is a signal flow diagram illustrating a PCI management method in the mobile communication system according to an embodiment of the present invention.

Referring to FIG. 3, the pico eNB 1 201a reports the first NRT update including the information in the neighbor cells around the pico eNB 1 201a to the SON server 207, at step 310. At this time, the pico eNB 1 201a transmits the first NRT along with its own PCI. The UE 203 connected to the pico eNB 2 201b as the serving eNB detects the PCI of the closest macro eNB as the UE 203 moves, at step 320. The UE 203 reports the detection of the macro eNB to the pico eNB 2 201b at step 330.

The pico eNB 2 201b requests the UE 203 for an ECGI as a Global Cell ID of the macro eNB, at step 340. Upon receiving the request, the UE 203 acquires the ECGI of the corresponding macro eNB at step 350. Next, the UE 203 reports the PCI and ECGI of the macro eNB to the pico eNB 2 201b, at step 360.

The pico eNB 2 201b searches its NRT for the PCI and ECGI of the macro eNB that are transmitted by the UE 203, at step 380. More specifically, the SON server 207 determines whether the PCIs of the pico eNB 1 101a and pico eNB 2 101b match each other. If the PCIs match each other, the SON server 207 determines whether the macro eNB information included in each of the first and second NRTs match each other. If the respective macro eNB information match each other, the SON server 207 reallocates PCIs to the first and second pico eNBs 101a and 101b, at step 390. Although not depicted in the drawing, the SON server 207 notifies the reallocated PCIs to the respective pico eNBs.

PCI management procedures of a SON server and a pico eNB according to an embodiment of the present invention are described hereinafter in detail with reference to FIGS. 4 and 5.

Figure 4:
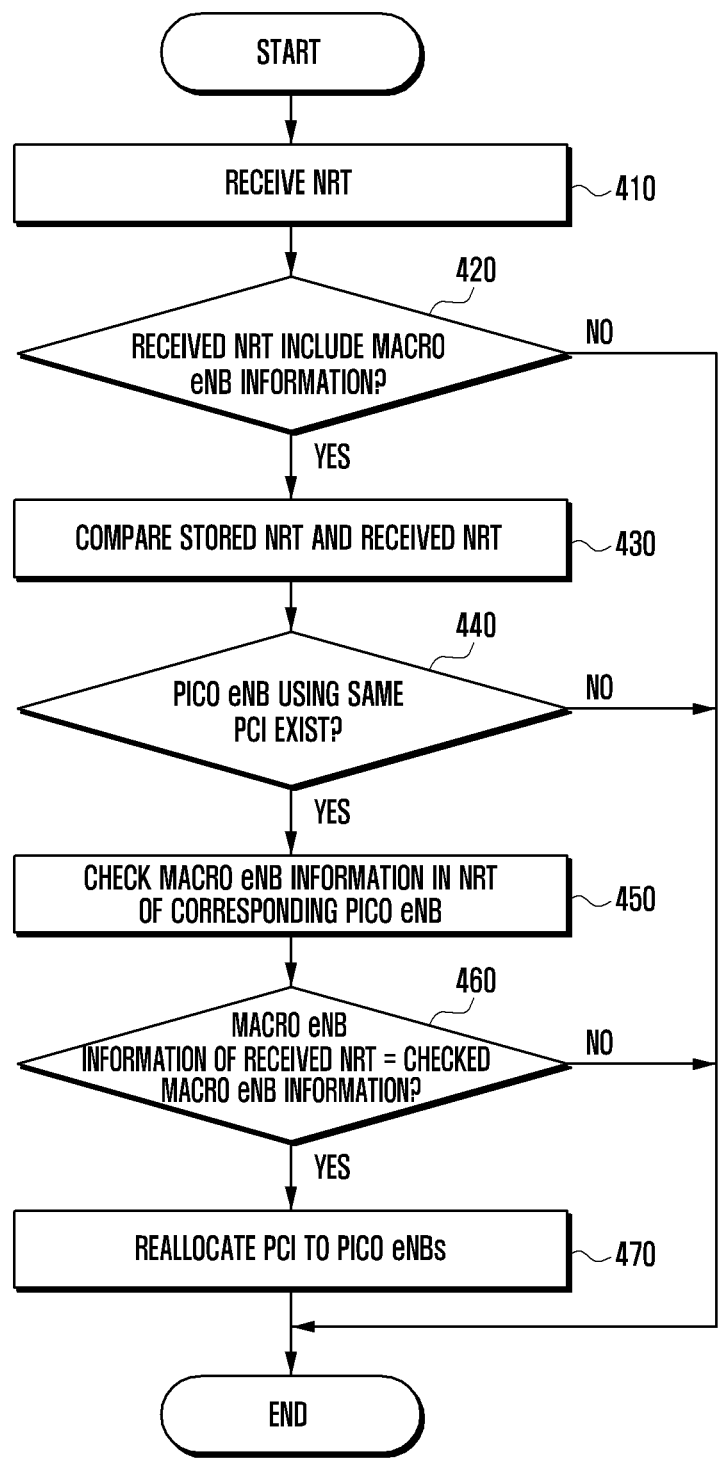
FIG. 4 is a flowchart illustrating a PCI management method performed by a SON server according to an embodiment of the present invention.

FIG. 4 is a flowchart illustrating a PCI management method performed by a SON server according to an embodiment of the present invention.

Referring to FIG. 4, the SON server 207 receives an NRT from a pico eNB, at step 410. The SON server determines whether the NRT includes eNB information, at step 420. Here, the NRT includes the information on the neighbor cells around the pico eNB. The macro eNB information includes PCI and ECGI of the macro eNB managing the macro cell close to the pico eNB.

If the received NRT includes the macro eNB information, the SON server 207 compares the received NRT with the NRTs of other pico eNBs that are previously stored, at step 430. Next, the SON server 207 determines, based on the NRT comparison result, whether there are at least two pico eNBs using the same PCI at step 440.

If there are at least two pico eNBs using the same PCI, the SON server 207 checks the macro eNB information stored in the NRT of the corresponding pico eNB (i.e., the pico eNB using same PCI), at step 450. Next, the SON server 207 determines whether the macro eNB information of the received NRT matches the checked macro eNB information, at step 460.

If the respective macro eNB information match each other, the SON server 207 reallocates PCIs to the corresponding pico eNBs respectively, at step 470. The SON server 207 notifies the corresponding pico eNBs of the reallocated PCIs. Otherwise, if the macro eNB information do not match each other, the SON server 207 does not reallocate PCIs.

The pico PCI confusion detection of the SON server 207 in the macro cell can be summarized as follows. The SON server 207 receives an updated NRT from the pico eNB 1 201a located within the macro cell. Next, the SON server 207 determines whether the received NRT includes the information on the macro eNB 205.

If the information on the macro eNB 205 is included, the SON server 207 checks the PCIs of other pico eNBs. Next, the SON server 207 determines whether there is a pico eNB 2 201b using the same PCI as the pico eNB 1 201a that has transmitted the NRT. Upon determining that the pico eNB 2 201b using the same PCI is present, the SON server 207 checks the NRT of the pico eNB 2 201b. That is, the SON server 207 determines whether the NRT of the pico eNB 2 201b includes the information on the macro eNB 205. If the NRT of the pico eNB 2 201b includes the information on the macro eNB 205, the SON server 207 determines that pico PCI confusion has occurred in the macro cell managed by the macro eNB 205. In this case, the SON server 207 reallocates PCIs to the pico eNBs.

Figure 5:
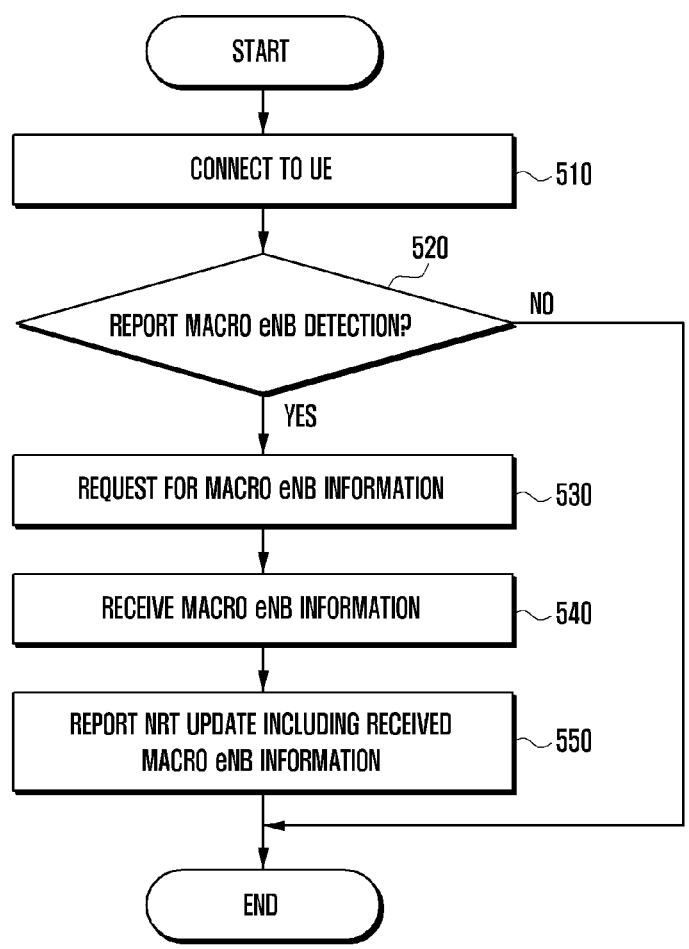
FIG. 5 is a flowchart illustrating a PCI management method performed by an eNB according to an embodiment of the present invention.

FIG. 5 is a flowchart illustrating a PCI management method performed by a pico eNB according to an embodiment of the present invention.

Referring to FIG. 5, the pico eNB 2 201b performs data communication with the UE 203 connected thereto, at step 510. The pico eNB 2 201b monitors to receive a macro eNB detection report transmitted by the UE 203 at step 520. When the UE 203 roams, the UE 203 detects a macro cell managed by the macro eNB 205 around the pico eNB 2 201b and reports the macro cell detection to the pico eNB 2 201b. If the macro eNB detection report is received, the pico eNB 2 201b requests the UE 203, which has reported the macro eNB detection, for macro eNB information, at step 530. The pico eNB 2 201b receives the macro eNB information from the UE 203, at step 540. Here, the macro eNB information includes a PCI and an ECGI allocated to the macro eNB. Next, the pico eNB 2 201b reports NRT update including the macro eNB information received from the UE 203 to the SON server 207, at step 550. Here, the pico eNB 2 201b transmits its PCI along with the NRT update. Although not depicted in the drawing, if a reallocated PCI is received from the SON server 207, the pico eNB 2 201b updates its PCI with the received PCI.

Through the above-described procedure, the SON server 207 detects and processes PCI confusion among the pico eNBs within a macro cell, resulting in a reduction of resource waste caused by using X2 interface. Accordingly, if an NRT is received from a pico eNB, the SON server 207 determines whether there are at least two pico eNBs using the same PCI within the same macro cell and, if so, reallocates PCIs to the pico eNBs.

As described above, a PCI management method according to embodiments of the present invention is capable of detecting PCI confusion without using X2 interface in the 3GPP LTE system. Also, the PCI management method according to embodiments of the present invention is capable of avoiding pico PCI confusion within a macro cell, which is likely to occur in a HetNet environment.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A base station identifier management method of a Self Organizing Network (SON) server, comprising:
    receiving a Neighbor Relation Table (NRT) including macro base station information from a pico base station;
    comparing the received NRT with a previously stored NRT;
    determining, based on a result of the comparison, whether at least two pico base stations using same (Physical Cell Identifier) PCI exist; and
    reallocating, upon determining that at least two pico base stations using same PCI exist, new PCIs to the pico base stations having the same PCI.

2. The base station identifier management method of claim 1, wherein reallocating comprises:
    checking macro base station information included in the previously-stored NRT;
    determining whether the checked macro base station information matches the macro base station information included in the received NRT; and
    reallocating, upon determining that the checked macro base station information matches the macro base station information included in the received NRT, the new PCIs to the pico base stations having the same PCI.

3. The base station identifier management method of claim 1, wherein the macro base station information includes at least one of a PCI and a Global Cell IDentifier (ID) of the macro base station.

4. A first pico base station managing base station identifiers, comprising:
    a transceiver for communication with other network nodes; and
    a controller configured to receive the macro base station information from a terminal, to transmit a Neighbor Relation Table (NRT) including the macro base station information to a Self Organizing Network (SON) server, to receive a reallocated (Physical Cell Identifier) PCI from the SON server, and to update PCI with the received reallocated PCI,
    wherein the reallocated PCI is reallocated by the SON server to determine whether a second pico base station using same PCI as the first pico base station exists by comparing a previously stored NRT with the received NRT.

5. The first pico base station of claim 4, wherein the reallocated PCI is reallocated by the SON server to check, upon determining that the second pico base station uses the same PCI as the first pico base station, macro base station information included in the NRT of the second pico base station, to determine whether the checked macro base station information matches the macro base station information included in the received NRT, and, upon determining that the checked macro base station information matches the macro base station information included in the received NRT, to reallocate new PCIs to the first pico base station and second pico base station.

6. The first pico base station of claim 4, wherein the macro base station information includes at least one of a PCI and a Global Cell IDentifier (ID) of the macro base station.

7. The first pico base station of claim 4, wherein the controller configured to receive a detection of a macro cell managed by the macro base station around the first pico base station from the terminal, and to request, to the terminal, for the macro base station information.

8. A Self Organizing Network (SON) server managing base station identifiers, comprising:
    a transceiver for communication with other network nodes; and
    a controller configured to receive a Neighbor Relation Table (NRT) including macro base station information from a pico base station, to compare the received NRT with a previously stored NRT, to determine, based on a result of the comparison, whether at least two pico base stations using same (Physical Cell Identifier) PCI exist, and to reallocate, upon determining that at least two pico base stations using same PCI exist, new PCIs to the pico base stations having the same PCI.

9. The SON server of claim 8, wherein the controller configured to check macro base station information included in the previously-stored NRT, to determine whether the checked macro base station information matches the macro base station information included in the received NRT, and to reallocate, upon determining that the checked macro base station information matches the macro base station information included in the received NRT, the new PCIs to the pico base stations having the same PCI.

10. The SON server of claim 8, wherein the macro base station information includes at least one of a PCI and a Global Cell IDentifier (ID) of the macro base station.

11. A base station identifier management method of a first pico base station, comprising:
    receiving macro base station information from a terminal;
    transmitting a Neighbor Relation Table (NRT) including the macro base station information from the first pico base station to a Self Organizing Network (SON) server;
    receiving a reallocated PCI from the SON server; and
    updating Physical Cell Identifier (PCI) with the received reallocated PCI,
    wherein the reallocated PCI is reallocated by the SON server to determine whether a second pico base station using same PCI as the first pico base station exists by comparing a previously stored NRT with the received NRT.

12. The base station identifier management method of claim 11, wherein the reallocated PCI is reallocated by the SON server to Checking, upon determining that the second pico base station uses the same PCI as the first pico base station, macro base station information included in the NRT of the second pico base station, to determine whether the checked macro base station information matches the macro base station information included in the received NRT, and to reallocate, upon determining that the checked macro base station information matches the macro base station information included in the received NRT, new PCIs to the first and second pico base stations.

13. The base station identifier management method of claim 11, wherein the macro base station information includes at least one of a PCI and a Global Cell IDentifier (ID) of the macro base station.

14. The base station identifier management method of claim 11, wherein receiving macro base station information comprises:

receiving, from the terminal, detection of a macro cell managed by the macro base station around the first pico base station; and requesting, to the terminal, for the macro base station information.

* * * * *